United States Patent
Miyazawa (10) Patent No.: US 9,726,866 B2
(45) Date of Patent: Aug. 8, 2017

(54) ZOOM LENS AND IMAGE PICKUP DEVICE INCLUDING THE SAME

(71) Applicant: CANON KABUSHIKI KAISHA, Tokyo (JP)

(72) Inventor: Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/205,766

(22) Filed: Mar. 12, 2014

(65) Prior Publication Data

US 2014/0293438 A1 Oct. 2, 2014

(30) Foreign Application Priority Data

Mar. 27, 2013 (JP) .................................. 2013-066107

(51) Int. Cl.
*G02B 15/14* (2006.01)
*G02B 15/16* (2006.01)

(52) U.S. Cl.
CPC .................................. *G02B 15/161* (2013.01)

(58) Field of Classification Search
CPC .................................................... G02B 15/161
USPC .................................................. 359/687, 686
See application file for complete search history.

(56) References Cited

U.S. PATENT DOCUMENTS

| 5,886,828 A * | 3/1999 | Kim ............................... 359/687 |
| 8,284,498 B2 | 10/2012 | Shinohara et al. |
| 2008/0310033 A1 | 12/2008 | Miyazawa |

FOREIGN PATENT DOCUMENTS

| CN | 1410793 A | 4/2003 |
| CN | 1611976 A | 5/2005 |
| CN | 102122058 A | 7/2011 |
| CN | 102129118 A | 7/2011 |
| JP | H8-82743 A | 3/1996 |
| JP | H08-234107 A | 9/1996 |
| JP | 2014-010324 A | 1/2014 |

OTHER PUBLICATIONS

Japanese Office Action issued in corresponding application No. 2013-066107 on Mar. 17, 2015.
Chinese office action issued in corresponding application No. 201410109828.0.
Chinese office action issued in corresponding application No. 201410109828.0 on Nov. 18, 2015.

\* cited by examiner

*Primary Examiner* — Alicia M Harrington
(74) *Attorney, Agent, or Firm* — Carter, DeLuca, Farrell & Schmidt, LLP

(57) ABSTRACT

A zoom lens includes a first lens unit having positive refractive power, a second lens unit having negative refractive power, a third lens unit having positive refractive power, and a fourth lens unit having positive refractive power, in order from an object side to an image side. During zooming, the first lens unit is not moved, and the second lens unit, the third lens unit, and the fourth lens unit are moved to change an interval between adjacent lens units. A moving amount m2 of the second lens unit during zooming from a wide angle end to a telephoto end, a focal length f2 of the second lens unit, and a focal length fw of a whole system at the wide angle end are each set appropriately.

7 Claims, 9 Drawing Sheets

ZOOM LENS AND IMAGE PICKUP DEVICE INCLUDING THE SAME

BACKGROUND OF THE INVENTION

Field of the Invention

The present invention relates to a zoom lens, and is particularly suitable as an image pickup optical system used in an image pickup device such as a video camera, a surveillance camera, a digital still camera, a broadcast camera, or a silver halide film camera.

Description of the Related Art

There is demand for an image pickup optical system in an image pickup device to nave a zoom lens with a small size, a wide angle of view, low aberration, and a high zoom ratio. As a zoom lens that easily achieves a high zoom ratio, a positive-dead zoom lens in which a first lens unit having positive refractive power, a second lens unit having negative refractive power, a third lens unit having positive refractive power, and a fourth lens unit having positive refractive power are arranged in order from the object side to the image side is known.

Japanese Patent Application Laid-Open No. H8-82743 and U.S. Pat. No. 8,284,498 disclose a rear focus type four-unit zoom lens in which the second lens unit and the third lens unit are moved for variable magnification and the fourth lens unit is moved for correction of image plane changes associated with variable magnification and for focusing.

Such a positive-lead four-unit zoom lens relatively easily achieves a high zoom ratio with the whole system being reduced in size. However, in order to achieve high optical performance over the whole zoom range with a wide angle of view, it is important to appropriately set the refractive power of each lens unit, in particular the refractive power of the second lens unit, the lens structure of each lens unit, and the like.

SUMMARY OF THE INVENTION

A zoom lens according to the present invention is a zoom lens including, in order from an object side to an image side: a first lens unit having positive refractive power; a second lens unit having negative refractive power; a third lens unit having positive refractive power; and a fourth lens unit having positive refractive power, wherein during zooming, the first lens unit is not moved, and the second lens unit, the third lens unit, and the fourth lens unit are moved to change an interval between adjacent lens units, and wherein, the following conditional expressions are satisfied $$-4.9 < m2/f2 < -3.7$$

$$-2.0 < f2/fw < -1.5$$

where m2 is a moving amount of the second lens unit during zooming from a wide angle end to a telephoto end, f2 is a focal length of the second lens unit, and fw is a focal length of a whole system at the wide angle end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The following describes embodiments or a zoom, lens and an image pickup device including the same according to the present invention, with reference to the drawings. The zoom lens according to the present invention includes a first lens unit having positive refractive power, a second lens unit having negative refractive power, a third lens unit having positive refractive power, and a fourth lens unit having positive refractive power, in order from the object side to the image side. During zooming, the first lens unit is not moved and the second, lens unit, the third lens unit, and the fourth lens unit are moved.

Figure 1:
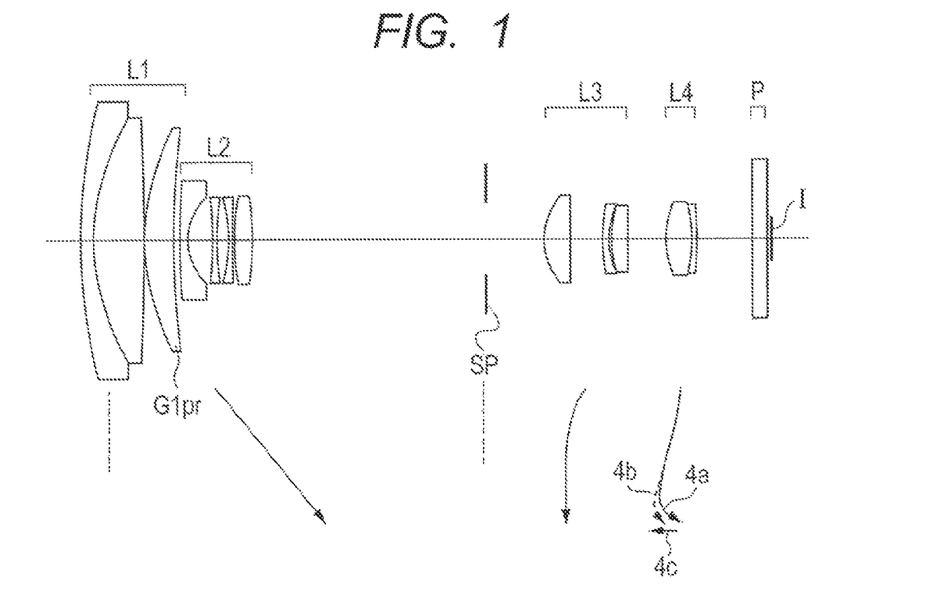
FIG. 1 is a lens sectional diagram, at a wide angle end, of a zoom lens in Embodiment 1.
Figure 2A:
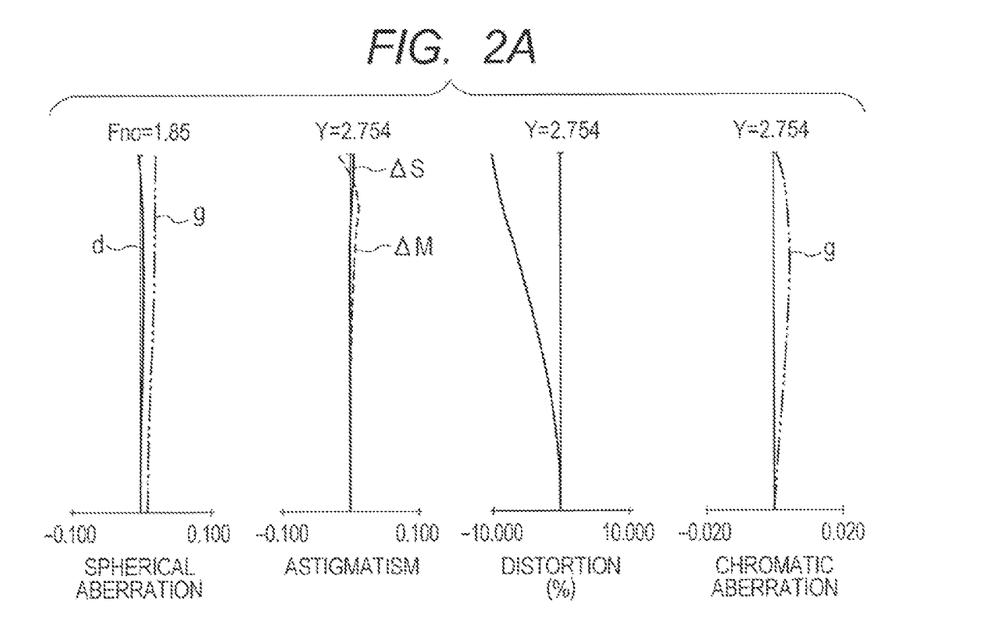
FIG. 2A is an aberration diagram, at the wide angle end, of the zoom lens in Embodiment 1.
Figure 2B:
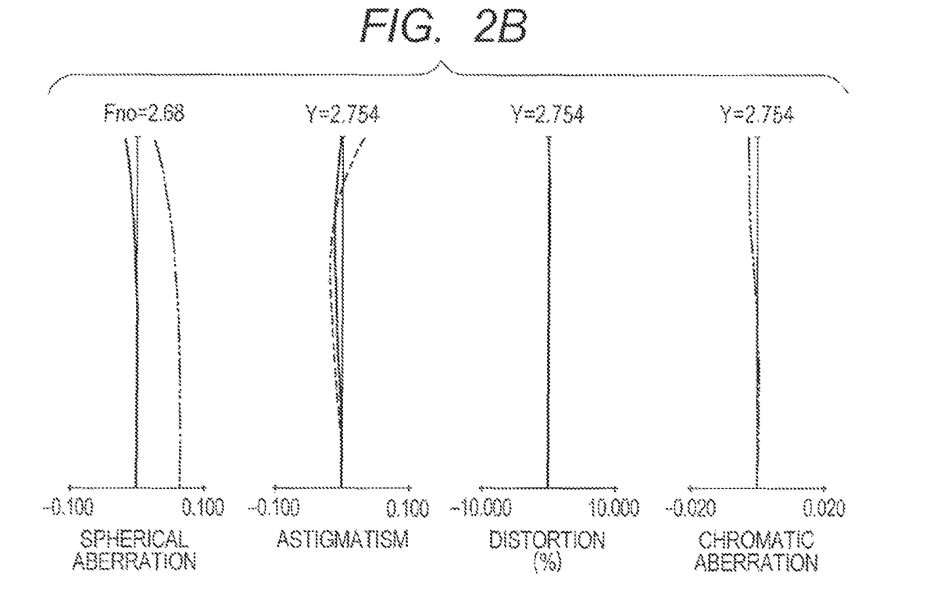
FIG. 2B is an aberration diagram, at an intermediate zoom position, of the zoom lens in Embodiment 1.
Figure 2C:
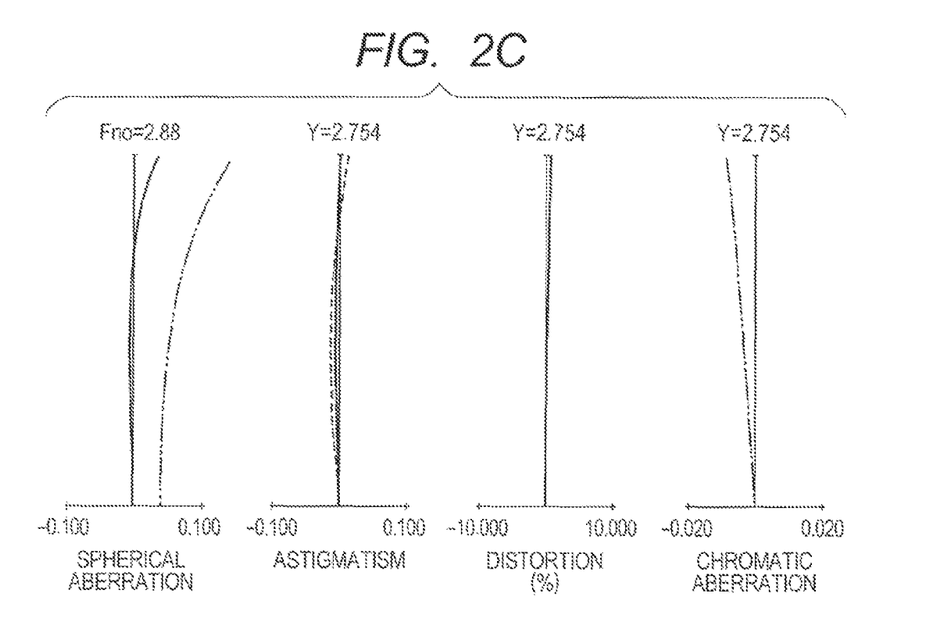
FIG. 2C is an aberration diagram, at a telephoto end, of the zoom lens in Embodiment 1.

FIG. 1 is a tens sectional diagram, at a wide angle end (short focal length end), of a zoom lens in Embodiment 1 of the present invention. FIGS. 2A, 2B, and 2C are aberration diagrams, respectively at the wide angle end, an intermediate zoom position, and a telephoto end (long focal length end), of the soon lens in Embodiment 1. The zoom lens in Embodiment 1 has a zoom ratio of 19.69 and an f-number of 1.35 to 2.38.

Figure 3:
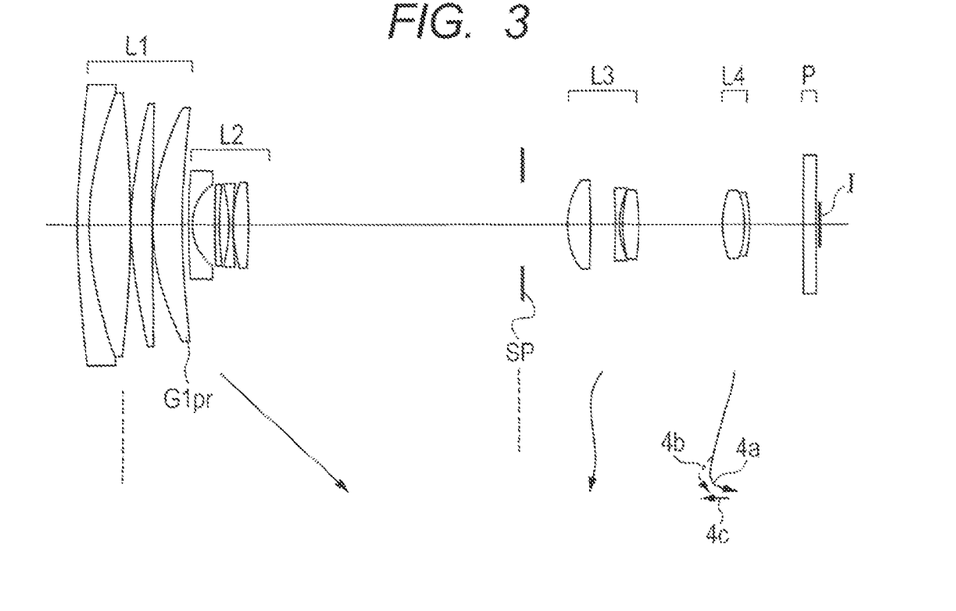
FIG. 3 is a lens sectional diagram, at the wide angle end, of a zoom lens in Embodiment 2.
Figure 4A:
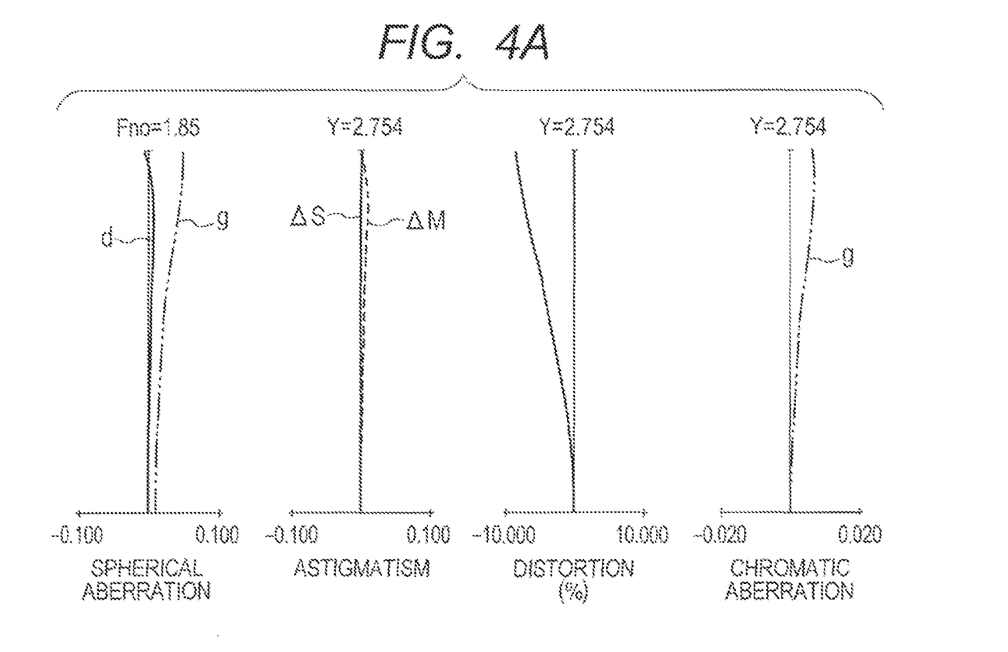
FIG. 4A is an aberration diagram, at the wide angle end, of the zoom lens in Embodiment 2.
Figure 4B:
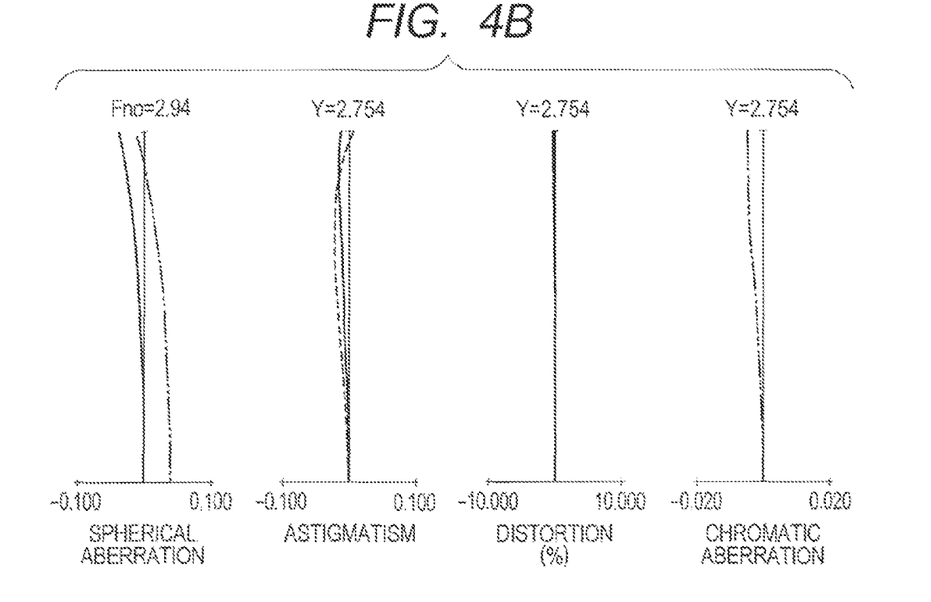
FIG. 4B is an aberration diagram, at the intermediate zoom position, of the zoom lens in Embodiment 2.
Figure 4C:
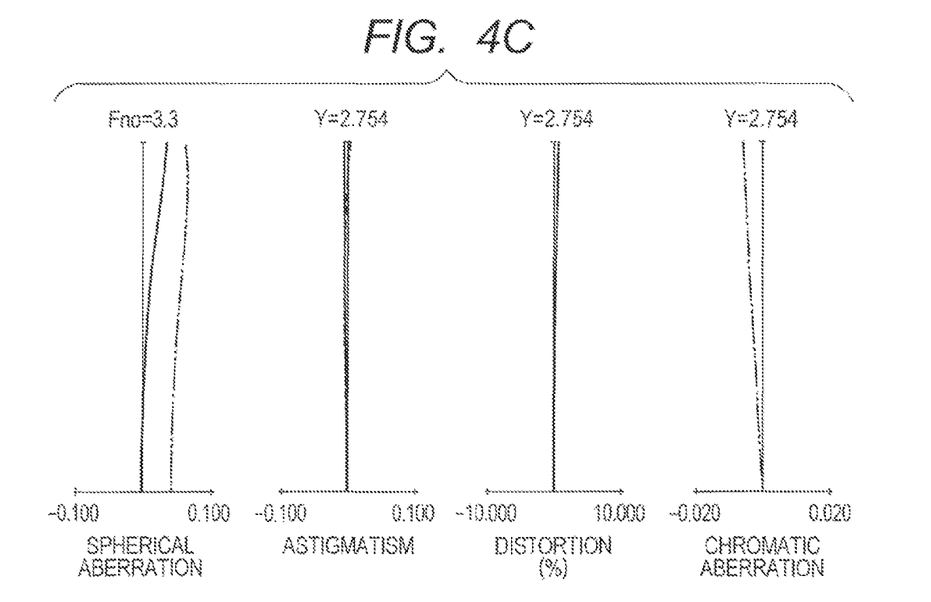
FIG. 4C is an aberration diagram, at the telephoto end, of the zoom lens in Embodiment 2.

FIG. 3 is a lens sectional diagram, at the wide angle end, of a zoom lens in Embodiment 2 of the present invention. FIGS. 4A, 4B, and 4C are aberration diagrams, respectively at the wide angle end, the intermediate zoom position, and the telephoto end, of the zoom lens in Embodiment 2. The zoom lens in Embodiment 2 has a zoom ratio of 29.59 and an f-number of 1.85 to 3.30.

Figure 5:
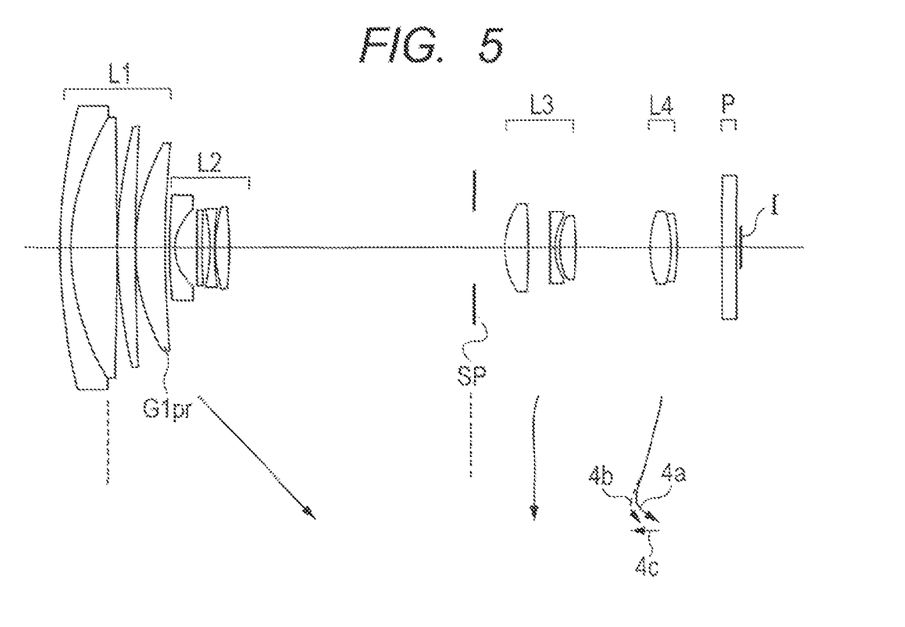
FIG. 5 is a lens sectional diagram, at the wide angle end, of a zoom lens in Embodiment 3.
Figure 6A:
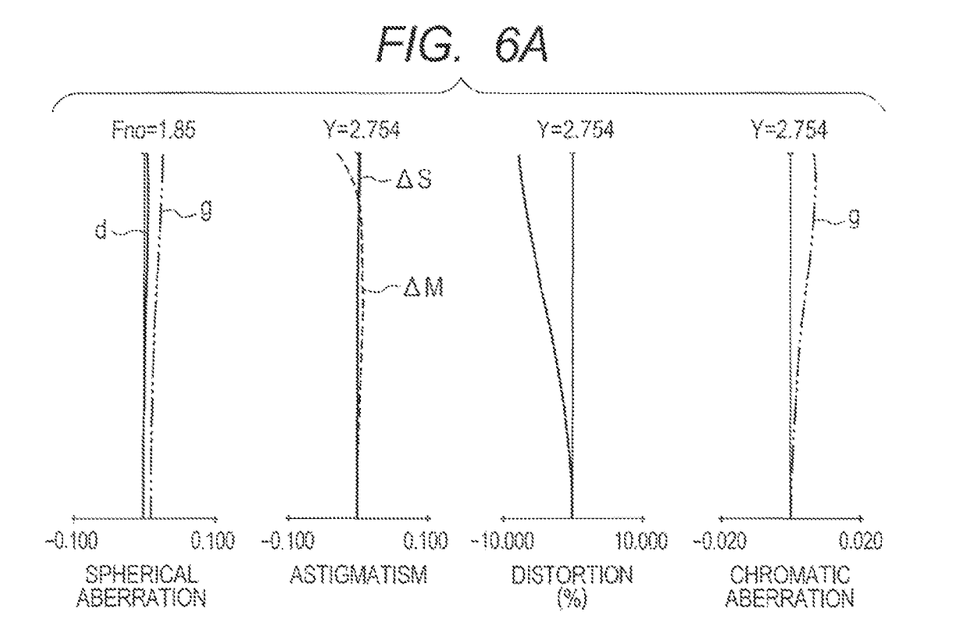
FIG. 6A is an aberration diagram, at the wide angle end, of the zoom lens in Embodiment 3.
Figure 6B:
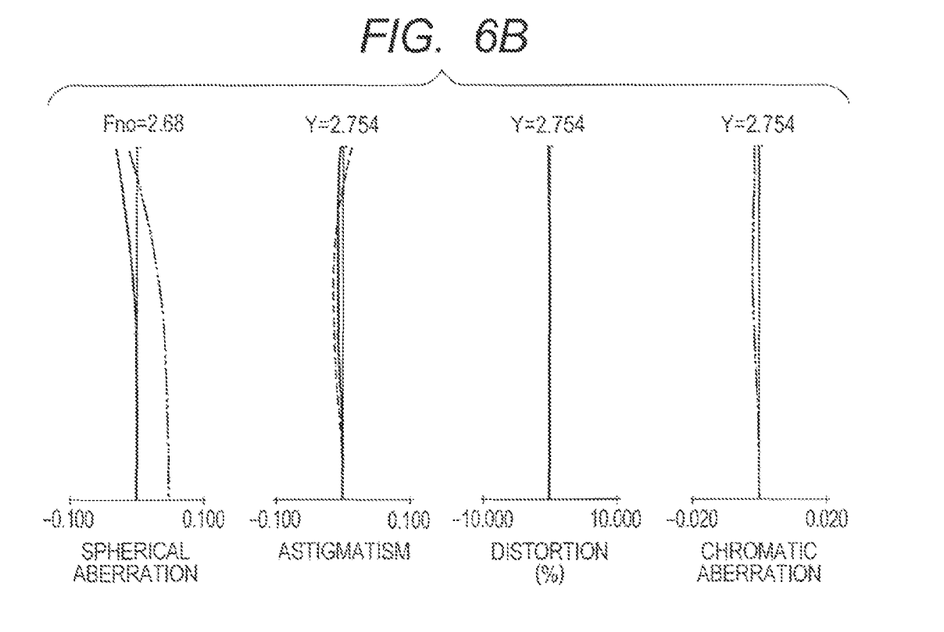
FIG. 6B is an aberration diagram, at the intermediate zoom position, of the zoom lens in Embodiment 3.
Figure 6C:
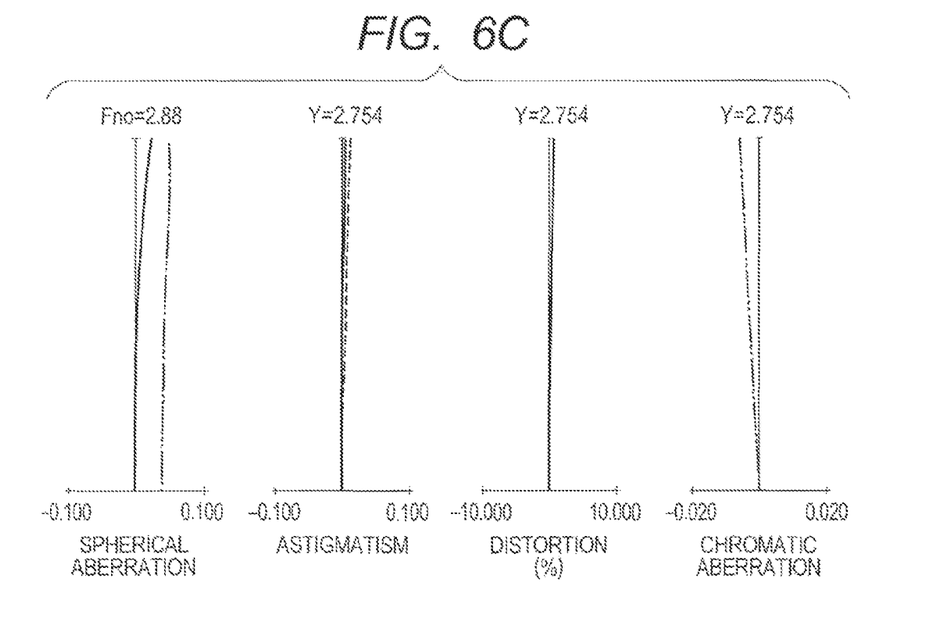
FIG. 6C is an aberration diagram, at the telephoto end, of the zoom lens in Embodiment 3.

FIG. 5 is a lens sectional diagram, at the wide angle end, of a zoom lens in Embodiment 3 of the present invention. FIGS. 6A, 6B, and 6C are aberration diagrams, respectively at the wide angle end, the intermediate zoom position, and the telephoto end, of the zoom lens in Embodiment 3. The zoom lens in Embodiment 3 has a zoom ratio of 22.27 and an f-number of 1.85 to 2.88.

Figure 7:
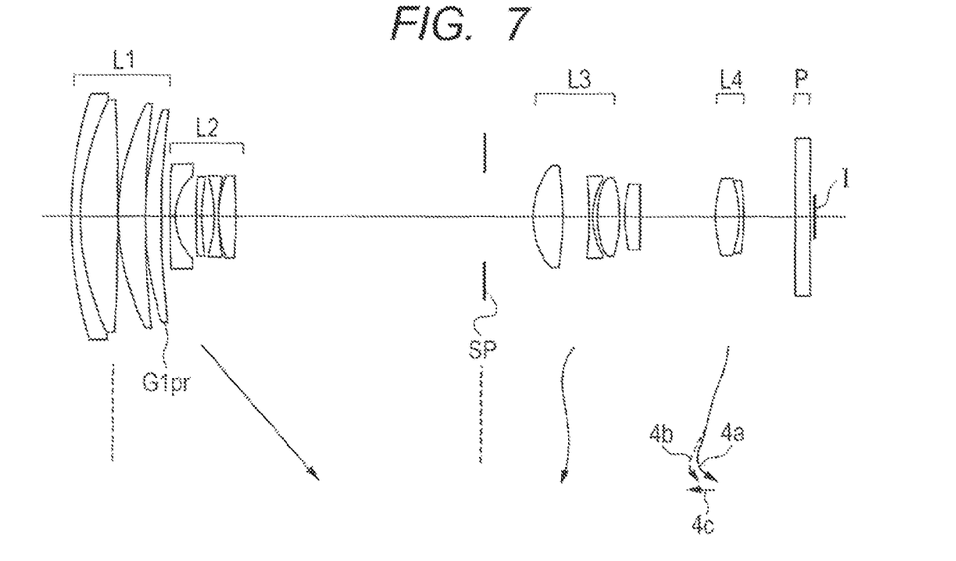
FIG. 7 is a lens sectional diagram, at the wide angle end, of a room lens in Embodiment 4.
Figure 8A:
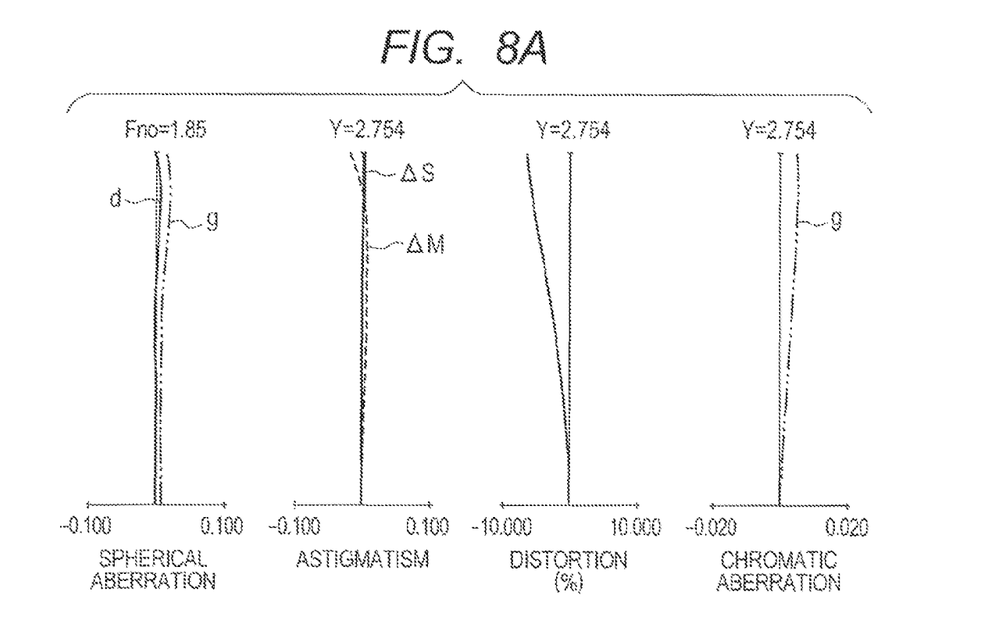
FIG. 8A is an aberration diagram, at the wide angle end, of the zoom lens in Embodiment 4.
Figure 8B:
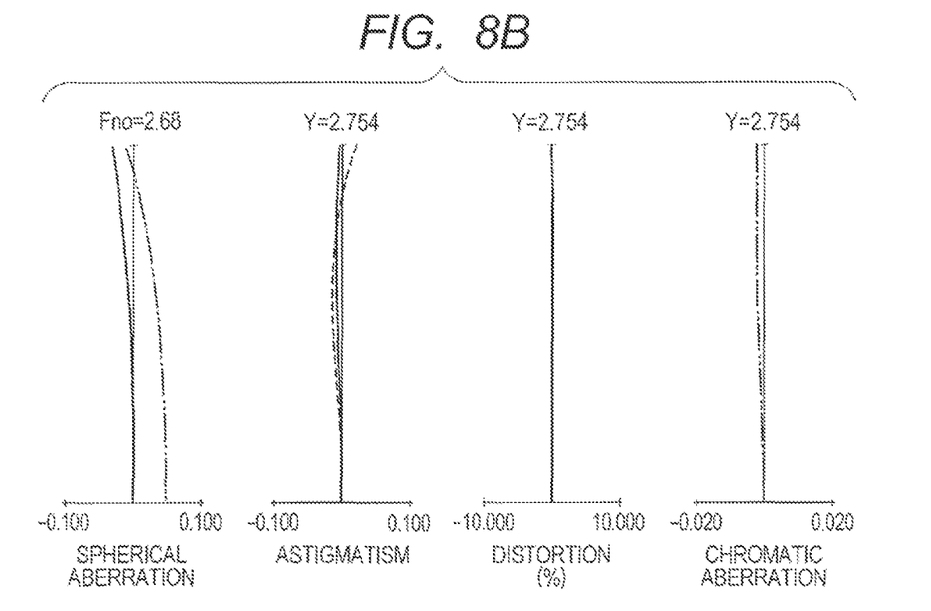
FIG. 8B is an aberration diagram, at the intermediate zoom position, of the zoom lens in Embodiment 4.
Figure 8C:
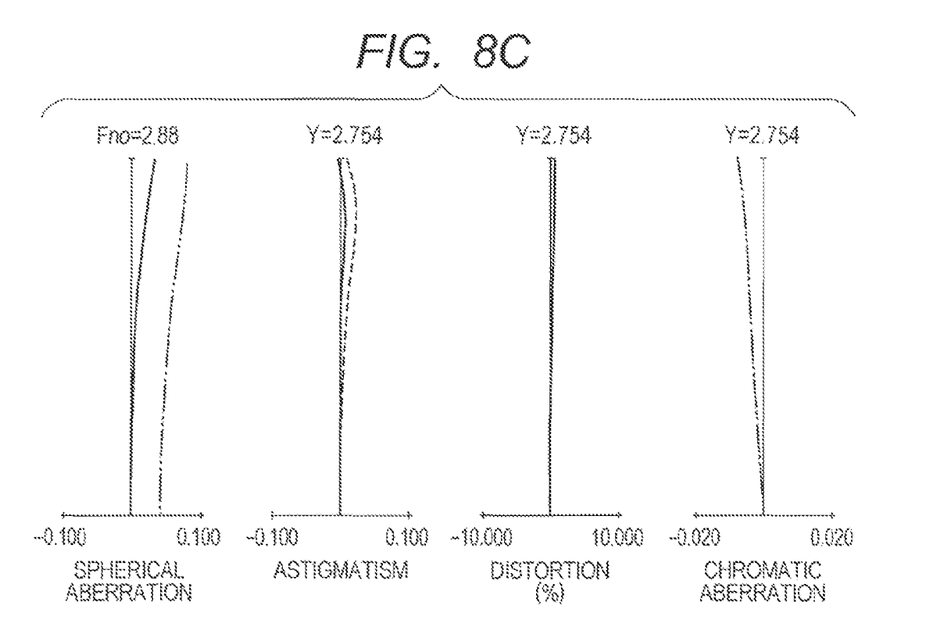
FIG. 8C is an aberration diagram, at the telephoto end, of the zoom lens in Embodiment 4.
Figure 9:
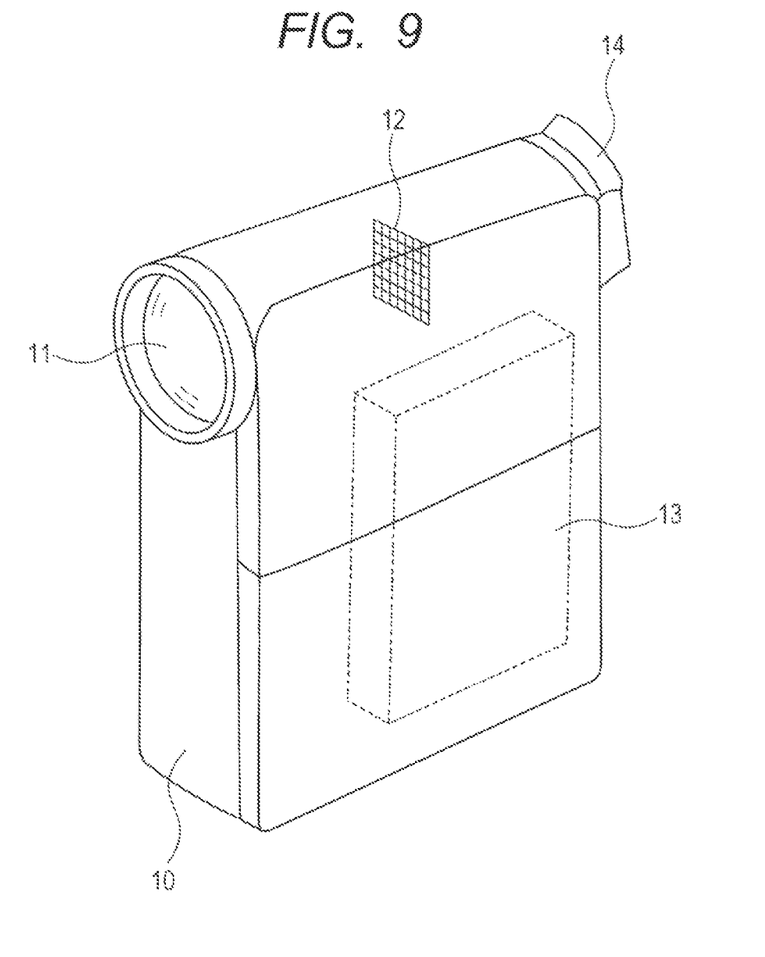
FIG. 9 is a schematic diagram or main parts of a video camera (image pickup device) including a zoom lens according to the present invention.

FIG. 7 is a lens sectional diagram, at the wide angle end, of a zoom lens in Embodiment 4 of line present invention. FIGS. 8A, 8B, and 8C are aberration diagrams, respectively at the wide angle end, the intermediate zoom position, and the telephoto end, of the zoom lens in Embodiment 4. The zoom lens in Embodiment 4 has a zoom ratio of 19.34 and art f-number of 1.85 to 2.88. FIG. 9 is a schematic diagram of main parts of a video camera (image pickup device) including a zoom lens according to the present invention.

The zoom lens in each embodiment is an imaging optical system used in an image pickup device. In the lens sectional diagrams, the left is the subject side (object side), and the right is the image side. In the lens sectional diagrams, L1 denotes a first lens unit having positive refractive power, L2 denotes a second lens unit having negative refractive power, L3 denotes a third lens unit having positive refractive power, and L4 denotes a fourth lens unit having positive refractive power. Moreover, SP denotes an aperture stop, which is located between the second lens unit L2 and the third lens unit L3. Each arrow indicates the moving locus during zooming from the wide angle end to the telephoto end and the moving direction during focusing.

Though the aperture stop SP is not moved during zooming in the zoom, lens in each embodiment, the aperture stop SP may be movable in an appropriate range. This facilitates further site reduction of the whole system. In each embodiment, the aperture stop SP is not moved during zooming, thus simplifying the image pickup device. P denotes an optical clock corresponding to an optical filter, a faceplate, or the like. I denotes an image plane, and corresponds to: an image pickup surface of a solid-state image pickup element such as a CCD sensor or a CMOS sensor in the case where the zoom lens is used as an imaging optical system in a digital still camera or a video camera; and a film surface in the case where the zoom lens is used in a silver halide film camera.

In the spherical aberration of the aberration diagrams, d denotes d-line, and g denotes g-line. In the astigmatism diagram, $\Delta M$ and $\Delta S$ respectively denote a meridional image plane and a sagittal image plane. The lateral chromatic aberration is represented by g-line. Fno denotes an f-number, and $\omega$ denotes a half angle of view (degrees). Note that, in each embodiment, the wide angle end and the telephoto end mean respective zoom positions when the variable-magnification lens unit is located at each of both ends of the movable range in the direction of the optical axis in the mechanism.

In each embodiment, when zooming from the wide angle end to the telephoto end, the lens units are moved as indicated by the arrows. In detail, the second lens unit L2 is moved monotonously toward the image side. The third lens unit L3 is moved so as to be located more on the object side at the telephoto end than at the wide angle end, to perform variable magnification.

The fourth lens unit L4 is moved toward the object side in a convex locus, to correct image plane changes associated with variable magnification. Moreover, each embodiment employs the rear focus type in which the fourth lens unit L4 is moved on the optical axis to perform focusing. A solid curve 4a and a dotted curve 4b relating to the fourth lens unit L4 respectively indicate moving loci for correcting image plane changes associated with zooming when focusing on an object at infinity and when focusing on a near object. The space between the third, lens unit L3 and true fourth lens unit L4 is effectively used by moving the fourth lens unit L4 toward the object side in a convex locus. This enables reduction of the total lens length.

In each embodiment, focusing from an object at infinity to a near object at the telephoto end is performed by moving the fourth lens unit L4 forward, as indicated by an arrow 4c. In each embodiment, all or part of the third lens unit L3 may be moved in a direction having a component perpendicular to the optical axis during imaging, to correct blur of a captured image caused when the zoom lens vibrates, i.e. to perform image blur correction.

The zoom lens in each embodiment includes the first lens unit L1 having positive refractive power, the second ions unit L2 having negative refractive power, the third lens unit L3 having positive refractive power, and the fourth lens unit L4 having positive refractive power, in order from the object side to the image side. During zooming, the first lens unit L1 is not moved, and the second lens unit L2, the third lens unit L3, and the fourth lens unit L4 are moved to change the interval between adjacent lens units. Let m2 be the moving amount of the second lens unit L2 during zooming from the wide angle end to the telephoto end, f2 be the focal length of the second lens unit L2, and fw be the focal length of the whole system at the wide angle end.

In this case, the following conditional expressions are satisfied.

$$-4.9 < m2/f2 < -3.7 \quad (1)$$

$$-2.0 < f2/fw < -1.5 \quad (2).$$

Here, the moving amount of the lens unit during zooming from the wide angle end to the telephoto end is the difference of the position of the lens unit on the optical axis at the wide angle end and at the telephoto end. The sign of the moving amount of the lens unit is plus when the lens unit is located more on the image side at the telephoto end than at the wide angle end, and minus when the lens unit is located more on the object, side at the telephone end than at the wide angle end.

The above-mentioned structure of the zoom lens according to the present invention suitable for ensuring a small whole system with a high zoom ratio. Decentering the first lens unit L1 is not desirable, because it causes she field curvature at the telephoto end to be not rotationally symmetric and, for example, makes the subject distance for focusing different between the left and right of the screen. Accordingly, the first lens unit 111 is not moved during zooming. Meanwhile, the second lens unit L2 and the third lens unit L3 are moved for variable magnification.

The third lens unit L3 is moved to shorten the entrance pupil position at the intermediate room position, thereby reducing the front lens effective diameter. The fourth lens unit L4 is moved to correct image plane changes associated with variable magnification. The above-mentioned conditional expressions (1) and (2) are thus satisfied.

The following describes the technical meanings of the conditional expressions (1) and (2). The conditional expression (1) relates to the ratio between the difference of the position of the second lens unit L2 during rooming from the wide angle end to the telephoto end and the focal length of the second lens unit L2. If the upper limit of the conditional expression (1) is exceeded, the third lens unit L1 needs to be brought closer to the image side at the wide angle end, in order to increase the difference of the position of the third, lens unit L3 so that a predetermined zoom ratio is attained. This causes the position of the third lens unit L3 and the position of the fourth lens unit L4 to be closer to each other at the wide angle end and as a result causes cams or actuators for driving the third lens unit L3 and the fourth lens unit L4 to approach, making it difficult to arrange them accurately.

If the lower limit is exceeded, on the other hand, the front lens effective diameter and the total lens length (the distance from the first lens surface to the image plane) increase or the negative refractive power of the second lens unit 12 becomes too high. This causes more changes of field curvature during zooming, which are difficult to be corrected.

The conditional expression (2) relates to the ratio between the focal length of the second lens unit L2 and the focal length at the wide angle end. If the upper limit of the conditional expression (2) is exceeded, the refractive power of the first lens unit L1 needs to be increased in order to maintain a predetermined angle of view at the wide angle end. As a result, spherical aberration and axial chromatic aberration increase especially in the range from the intermediate zoom position to the telephoto end, which are difficult to be corrected. If the lower limit is exceeded, on the other hand, the front lens effective diameter and the total lens length increase.

Moreover, in the zoom lens according to the present invention, at least one of the following conditional expressions may be satisfied. Let m3 be the moving amount of the third lees unit L3 daring zooming from the wide angle end to the telephoto end. Suppose the first lens unit L1 includes, nearest the image side, a lens G1pr having positive refractive power. Let N1pr be the refractive index of the material of the lens G1pr, and N1pf be the mean value of the refractive indices of the materials of the lenses having positive refractive power included in the first lens unit L1 other than the lens G1pr.

Let N34n be the mean value of the refractive indices of the materials of the negative lenses included in the third, lens unit L3 and the fourth lens unit L4, and N34p be the mean value of the refractive indices of the materials of the positive lenses included in the third lens unit L3 and the fourth lens unit L4. In this case, at least one of the following conditional expressions may be satisfied.

$$-25.0 < m2/m3 < -2.0 \quad (3)$$

$$1.05 < N1pr/N1pf < 1.40 \quad (4)$$

$$1.1 < N34n/N34p < 1.3 \quad (5)$$

The following describes the technical meanings of the conditional expressions. The conditional expression (3) relates to the ratio between the moving amount of the second lens unit L1 during zooming from the wide angle end to the telephoto end and the moving amount of the third lens unit L3 during zooming from the wide angle end to the telephoto end.

If the moving amount of the second lens unit L2 decreases and the moving amount of the third lens unit L3 increases and the upper limit of the conditional expression (3) is exceeded, the load of variable magnification on the third lens unit L3 increases. However, the third lens unit L3 is less contributory to variable magnification than the second lens unit. Hence, a high zoom ratio is difficult to be attained. If the moving amount of the third lens unit it decreases and the lower limit is exceeded, on the other hand, the moving amount of the entrance pupil position decreases due to the movement of the third lens unit L3 during zooming. This makes it difficult to reduce the front lens effective diameter and widen the angle of view.

The conditional expression (4) relates to the ratio between the refractive index of the material of the positive lens G1pr nearest the image side in the first lens unit L1 and the mean value of the refractive indices of the materials of the positive lenses in the first lens unit L1 other than the positive lens G1pr nearest the image side. In the first lens unit L1, the angle between the light passing through the lenses and the optical axis is at the maximum in the positive lens G1pr nearest the image side. Therefore, the light effective diameter difference between the lens surface on the object side and the lens surface on the image side is smaller when the positive lens G1pr nearest the image side in the first lens unit L1 is made thinner. This facilitates reduction of the front lens effective diameter.

However, if the refractive power of the positive lens G1pr nearest, the image side in the first lens unit L1 is weakened, the light will end up passing at a steep angle with the optical axis more on the object side, causing an increase in front lens effective diameter, for a smaller front lets effective diameter, it is effective to increase the refractive index of the material of the positive lens G1pr nearest the image side in the first lens unit L1 to increase the curvature radius of the lens surface, and make the lens thinner while maintaining the refractive power at a predetermined position.

If the upper limit of the conditional expression (4) is exceeded, it is advantageous to the reduction of the front ions effective diameter, but the Petzval sum increases and field curvature is difficult to be corrected. If the lower limit is exceeded, on the other hand, the front lens effective diameter, increases.

The conditional expression (5) defines the ratio between the mean value of the refractive indices of the materials of the negative lenses in the third lens unit L3 and the fourth lens unit L4 and the mean value of the refractive indices of the materials of the positive lenses in the third lens unit L3 and the fourth lens unit L1. If the refractive index of the material of the positive lens decreases and the upper limit of the conditional expression (5) is exceeded, the curvature radius of the lens surface decreases, causing many nigh-order aberrations. Spherical aberration, coma aberration, and the like per wavelength are difficult to be corrected. If the lower limit is exceeded, on the other hand, spherical aberration increases at the wide angle end and also field curvature changes more during zooming, which are difficult to be corrected. If is further desirable to specify the numerical ranges of the conditional expressions (1) to (5) as follows.

$$-4.85 < m2/f2 < -3.80 \quad (1a)$$

$$-2.00 < f2/fw < -1.55 \quad (2a)$$

$$-23.5 < m2/m3 < -5.5 \quad (3a)$$

$$1.08 < N1pr/N1pf < 1.35 \quad (4a)$$

$$1.15 < N34n/N34p < 1.25 \quad (5a).$$

In the zoom lens according to the present invention, the first lens unit L1 desirably includes one negative lens and at most three positive lenses.

A method of arranging the first lens unit L1 having the same structure as a wide converter on she object side is available for the zoom type in which the composite focal, length of the lens units from the second lens unit L2 onward is long, when, reducing the front lens effective diameter in a zoom lens with a wide angle of view and a high zoom ratio. This method, however, increases the total lens length and also increases the weight of the first lens unit L1.

Therefore, in the zoom lens according to the present invention, the first lens unit L1 has the above-mentioned structure to reduce the front lens effective diameter while minimizing increases in the total lens length and the weight, of the first lens unit L1. If is especially desirable that the first lens unit L1 includes one negative lens for achromatism and at most three positive lenses for correction of spherical aberration, coma aberration, axial chromatic aberration, and the like mainly at the telephoto end. In the zoom, lens according to the present invention, the aperture stop SF is provided between the second lens unit L2 and the third lens unit L3, and the aperture stop SP is not moved during zooming.

In the four-unit zoom lens according to the present invention, the aperture stop SP may be disposed between the second lens unit L2 and the third lens unit L3 or in the third lens unit L3, in order to allow off-axis light to pass through the aperture even when the aperture diameter of the aperture stop SP is reduced. However, moving the aperture stop SP during zooming requires more actuators or a larger lens barrel.

In view of this, in the zoom lens according to the present invention, the aperture stop SP is disposed between the second lens unit L2 and the third lens unit L3, and the aperture stop SP is not moved during zooming.

As described above, according to each embodiment, it is easy to realize a zoom lens having favorable optical performance and a high zoom ratio with a small number of lenses even when manufacturing errors are taken into account.

The following describes the lens structure or each tens unit. The first lass unit L1 includes a cemented lens in which a negative lens (a lens having negative refractive power) and a positive lens (a lens having positive refractive power) are cemented together, and at least one positive meniscus lens whose surface on the object side is convex, in the zoom lens in each embodiment, the refractive power of the first lens unit L1 is increased to reduce the size of the whole system. When increasing the refractive power, various aberrations frequently occur in the first lens unit L1. Especially, spherical aberration frequently occurs on the telephoto side. Accordingly, the positive refractive power of the first lens unit L1 is shared by the cemented lens and the at least one positive lens, thus reducing these various aberrations.

The second lens unit L2 has a higher absolute value of the refractive power on the image side than on the object side, and includes four independent lenses, namely, a negative lens whose lens surface on the image side is concave, two negative lenses, and a positive lens. In the zoom lens in each embodiment, the refractive power of the second lens unit. L2 is increased to reduce the effective diameter of the first lens unit L1 while ensuring a wide angle of view at the wide angle end.

When increasing the refractive power of the second lens unit L2, various aberrations frequently occur in the second lens unit L2. Especially, field curvature and lateral chromatic aberration frequently occur on the wide angle side. In each embodiment, the negative refractive power of the second lens unit L2 is shared by the three negative lenses. In addition, lateral chromatic aberration is reduced by the positive lens. Such a lens structure enables a smaller front lens effective diameter and high optical performance to be achieved with a wide angle of view.

The third lens unit L3 includes a positive lens whose lens surface on the object side is convex, a negative lens, and a positive lens. In the zoom lens in each embodiment, the refractive power of the third lens unit L3 is increased to reduce the moving amount (the difference of the position) during rooming while reducing the total lens length at the wide angle end. When increasing the refractive power, various aberrations frequently occur in the third lens unit L3. Especially, axial chromatic aberration and coma aberration frequently occur.

Accordingly, the power of the third lens unit L3 is shared by the two positive lenses and the negative lens, and also one lens surface of the first positive lens from the object side is aspherically shaped to reduce coma aberration. Besides, a low-dispersion material (whose Abbe number is greater than or equal to 70) is used, as the material of the second positive lens from the object side, to reduce axial chromatic aberration.

The fourth lens unit L4 includes a cemented lens in which a positive lens and a negative lens are cemented together. In each embodiment, the cemented lens structure of the fourth lens unit L4 reduces lateral chromatic aberration and field curvature changes during zooming.

In each embodiment, the above-mentioned structure of each lens unit enables obtainment of a zoom lens whose whole system is small and that supports a wide angle of view, i.e. an imaging angle of view of 65 to 72° at the wide angle end, and a high zoom ratio, i.e. a zoom ratio of about 19 to 30. When the zoom lens in each embodiment is used in art image pickup device, distortion aberration from among various aberrations may be corrected by electrical image processing. In particular, the front lens effective diameter can be easily reduced by setting the image pickup range on the wide angle side to be small with respect to the maximum image pickup range and correcting the above-mentioned distortion aberration.

In the zoom lens according to the present invention, the effective image diameter at the wide angle end may be smaller than the effective image diameter at the telephoto end.

The following shows Numerical Examples 1 to 4 respectively corresponding to Embodiments 1 to 4. In each numerical example, i denotes the ordinal position of a surface from, the object side, ri denotes the curvature radius of the ith surface, di denotes the interval between the ith surface and the (i+1)th surface, and ndi and vdi respectively denote the refractive index and the Abbe number of the material of the ith optical member with respect to d-line.

In Numerical Examples 1 to 4, two surfaces nearest the image side are each a plane corresponding to an optical block. BF denotes back focus, which is an air-converted distance from the last lens surface to the image plane. Regarding an aspherical surface, let X be a displacement in the direction of the optical axis at a height H from the optical axis with respect to a surface vertex. The light travel direction is set to positive. Let R be a paraxial curvature radius, k be a conic constant, and A4 and A6 be aspherical coefficients. In this case, X is given by the following expression.

$$X = \frac{H^2/R}{1+\sqrt{1-(1+k)(H/R)^2}} + A4H^4 + A6H^6$$

Here, * denotes a surface having an aspherical shape, and "e-x" denotes $10^{-x}$. The angle of view is calculated at $\tan^{-1}(y/f)$ where y is the image height and f is the focal length. Table 1 shows the relations between the above-mentioned conditional expressions and the numerical values in the numerical examples.

Numerical Example 1

Unit mm

Surface data

| Surface number | r | d | nd | vd |
|---|---|---|---|---|
| 1 | 78.363 | 1.55 | 1.85478 | 24.8 |
| 2 | 30.860 | 6.28 | 1.59282 | 68.6 |
| 3 | −308.803 | 0.20 | | |
| 4 | 30.208 | 3.59 | 1.83481 | 42.7 |
| 5 | 100.485 | (variable) | | |
| 6 | 248.972 | 0.80 | 1.91082 | 35.3 |
| 7 | 7.731 | 3.28 | | |
| 8 | −42.970 | 0.65 | 1.83481 | 42.7 |
| 9 | 30.582 | 1.39 | | |
| 10 | −21.227 | 0.60 | 1.83481 | 42.7 |
| 11 | −394.864 | 0.17 | | |
| 12 | 29.903 | 2.14 | 1.95906 | 17.5 |
| 13 | −40.022 | (variable) | | |
| 14 (stop) | ∞ | (variable) | | |
| 15* | 9.641 | 3.17 | 1.58313 | 59.4 |
| 16 | −195.002 | 4.23 | | |
| 17 | 33.596 | 0.60 | 2.00100 | 29.1 |
| 18 | 8.880 | 0.44 | | |
| 19* | 12.155 | 2.19 | 1.55332 | 71.7 |
| 20 | −164.942 | (variable) | | |
| 21 | 13.336 | 3.19 | 1.63654 | 55.4 |
| 22 | −17.040 | 0.60 | 1.84656 | 23.9 |
| 23 | −55.163 | (variable) | | |
| 24 | ∞ | 1.97 | 1.51633 | 64.1 |
| 25 | ∞ | | | |
| Image plane | ∞ | | | |

Aspherical surface data

15th surface

K = −1.03637e+000   A4 = 5.15644e−005   A6 = 8.02003e−008

19th surface

K = −7.32904e−001   A4 = −2.11685e−005   A6 = 5.90416e−007

Various data
Zoom ratio 19.69

| | Wide angle | Intermediate | Telephoto |
|---|---|---|---|
| Focal length | 3.78 | 28.09 | 74.43 |
| F-number | 1.85 | 2.68 | 2.88 |
| Half angle of view (degrees) | 36.07 | 5.60 | 2.12 |
| Image height | 2.75 | 2.75 | 2.75 |
| Total lens length | 87.68 | 87.68 | 87.68 |
| BF | 9.33 | 14.84 | 9.68 |
| d5 | 0.94 | 23.29 | 28.88 |
| d13 | 29.83 | 7.48 | 1.90 |
| d14 | 7.64 | 2.85 | 2.85 |
| d20 | 4.84 | 4.12 | 9.28 |
| d23 | 7.04 | 12.55 | 7.39 |

Zoom lens unit data

| Unit | Starting surface | Focal length |
|---|---|---|
| 1 | 1 | 41.95 |
| 2 | 6 | −7.34 |
| 3 | 14 | ∞ |
| 4 | 15 | 23.08 |
| 5 | 21 | 19.79 |
| 6 | 24 | ∞ |

Numerical Example 2

Unit mm

Surface data

| Surface number | r | d | nd | vd |
|---|---|---|---|---|
| 1 | 156.468 | 1.65 | 1.80610 | 33.3 |
| 2 | 48.625 | 5.92 | 1.43700 | 95.1 |
| 3 | −179.010 | 0.17 | | |
| 4 | 65.127 | 2.83 | 1.49700 | 81.5 |
| 5 | 432.018 | 0.17 | | |
| 6 | 35.270 | 4.29 | 1.59522 | 67.7 |
| 7 | 139.631 | (variable) | | |
| 8 | 220.919 | 0.66 | 1.88300 | 40.8 |
| 9 | 7.915 | 3.10 | | |
| 10 | 487.280 | 0.60 | 2.00069 | 25.5 |
| 11 | 50.122 | 1.30 | | |
| 12 | −21.009 | 0.60 | 1.91082 | 35.3 |
| 13 | 42.671 | 0.17 | | |
| 14 | 23.455 | 2.02 | 2.10205 | 16.8 |
| 15 | −73.508 | (variable) | | |
| 16 (stop) | ∞ | (variable) | | |
| 17* | 11.018 | 3.24 | 1.58313 | 59.4 |
| 18 | −217.714 | 3.64 | | |
| 19 | −97.507 | 0.60 | 1.80610 | 33.3 |
| 20 | 12.376 | 0.52 | | |
| 21* | 18.354 | 2.21 | 1.55332 | 71.7 |
| 22 | −29.919 | (variable) | | |
| 23 | 15.788 | 3.01 | 1.59522 | 67.7 |
| 24 | −14.064 | 0.60 | 1.90366 | 31.3 |
| 25 | −29.892 | (variable) | | |
| 26 | ∞ | 1.97 | 1.51633 | 64.1 |
| 27 | ∞ | | | |
| Image plane | ∞ | | | |

Aspherical surface data

17th surface

K = −2.48235e−001   A4 = −1.62827e−005   A6 = −1.20469e−007

21st surface

K = −5.88650e+000   A4 = 3.74746e−005   A6 = −5.23611e−007

Various data
Zoom ratio 29.59

| | Wide angle | Intermediate | Telephoto |
|---|---|---|---|
| Focal length | 3.90 | 42.44 | 115.42 |
| F-number | 1.85 | 2.94 | 3.30 |
| Half angle of view (degree) | 35.23 | 3.71 | 1.37 |
| Image height | 2.75 | 2.75 | 2.75 |
| Total lens length | 105.99 | 105.99 | 105.99 |
| BF | 10.22 | 17.44 | 9.45 |
| d7 | 0.83 | 33.21 | 38.15 |
| d15 | 38.98 | 6.60 | 1.66 |
| d16 | 6.55 | 3.86 | 3.09 |
| d22 | 12.11 | 7.59 | 16.35 |
| d25 | 7.93 | 15.15 | 7.15 |

Zoom lens unit data

| Unit | Starting surface | Focal length |
|---|---|---|
| 1 | 1 | 51.74 |
| 2 | 8 | −7.76 |
| 3 | 16 | ∞ |
| 4 | 17 | 26.55 |
| 5 | 23 | 22.10 |
| 6 | 26 | ∞ |

Numerical Example 3

Unit mm

Surface data

| Surface number | r | d | nd | vd |
|---|---|---|---|---|
| 1 | 80.533 | 1.63 | 1.80610 | 33.3 |
| 2 | 35.312 | 6.55 | 1.43700 | 95.1 |
| 3 | −731.128 | 0.16 | | |
| 4 | 66.197 | 2.31 | 1.49700 | 81.5 |
| 5 | 239.131 | 0.17 | | |
| 6 | 31.288 | 4.12 | 1.59522 | 67.7 |
| 7 | 188.277 | (variable) | | |
| 8 | 117.072 | 0.62 | 1.88300 | 40.8 |
| 9 | 7.241 | 3.20 | | |
| 10 | −348.351 | 0.60 | 2.00069 | 25.5 |
| 11 | 78.155 | 1.12 | | |
| 12 | −18.328 | 0.60 | 1.91082 | 35.3 |
| 13 | 35.258 | 0.17 | | |
| 14 | 22.320 | 1.92 | 2.10205 | 16.8 |
| 15 | −63.226 | (variable) | | |
| 16 (stop) | ∞ | (variable) | | |
| 17* | 9.731 | 3.37 | 1.58313 | 59.4 |
| 18 | −72.681 | 2.96 | | |
| 19 | 526.078 | 0.60 | 1.80610 | 33.3 |
| 20 | 8.789 | 0.85 | | |
| 21* | 11.845 | 2.14 | 1.55332 | 71.7 |
| 22 | −62.598 | (variable) | | |
| 23 | 15.631 | 3.15 | 1.59522 | 67.7 |
| 24 | −12.878 | 0.60 | 1.90366 | 31.3 |
| 25 | −27.059 | (variable) | | |
| 26 | ∞ | 1.97 | 1.51633 | 64.1 |
| 27 | ∞ | | | |
| Image plane | ∞ | | | |

Aspherical surface data

17th surface

K = −4.50803e−001  A4 = −1.33946e−005  A6 = −2.84777e−007

21st surface

K = −1.31826e+000  A4 = 2.06647e−005  A6 = 1.32008e−006

Various data
Zoom ratio 22.27

| | Wide angle | Intermediate | Telephoto |
|---|---|---|---|
| Focal length | 3.94 | 38.76 | 87.68 |
| F-number | 1.85 | 2.68 | 2.88 |
| Half angle of view (degrees) | 34.97 | 4.06 | 1.80 |
| Image height | 2.75 | 2.75 | 2.75 |
| Total lens length | 95.72 | 95.72 | 95.72 |
| BF | 8.94 | 16.20 | 10.62 |
| d7 | 0.66 | 28.95 | 33.27 |
| d15 | 34.24 | 5.95 | 1.64 |
| d16 | 4.56 | 3.17 | 3.11 |
| d22 | 10.48 | 4.62 | 10.25 |
| d25 | 6.64 | 13.90 | 8.33 |

Zoom lens unit data

| Unit | Starting surface | Focal length |
|---|---|---|
| 1 | 1 | 46.74 |
| 2 | 8 | −7.09 |
| 3 | 16 | ∞ |
| 4 | 17 | 22.97 |
| 5 | 23 | 21.44 |
| 6 | 26 | ∞ |

Numerical Example 4

Unit mm

Surface data

| Surface number | r | d | nd | vd |
|---|---|---|---|---|
| 1 | 53.156 | 1.29 | 2.00069 | 25.5 |
| 2 | 34.139 | 4.62 | 1.43700 | 95.1 |
| 3 | −804.569 | 0.17 | | |
| 4 | 32.500 | 3.35 | 1.43875 | 94.9 |
| 5 | 116.329 | 0.17 | | |
| 6 | 44.909 | 1.82 | 1.88300 | 40.8 |
| 7 | 89.988 | (variable) | | |
| 8 | 120.894 | 0.60 | 1.95375 | 32.3 |
| 9 | 7.651 | 2.84 | | |
| 10 | 63.868 | 0.60 | 1.83481 | 42.7 |
| 11 | 26.578 | 1.60 | | |
| 12 | −16.232 | 0.60 | 1.71300 | 53.9 |
| 13 | 25.881 | 0.17 | | |
| 14 | 20.245 | 1.79 | 2.10300 | 18.1 |
| 15 | −100.309 | (variable) | | |
| 16 (stop) | ∞ | (variable) | | |
| 17* | 10.374 | 3.64 | 1.58313 | 59.4 |
| 18 | −73.078 | 3.49 | | |
| 19 | −77.487 | 0.60 | 1.91082 | 35.3 |
| 20 | 10.233 | 0.46 | | |
| 21* | 11.144 | 2.64 | 1.55332 | 71.7 |
| 22 | −25.870 | (variable) | | |
| 23 | 16.078 | 2.92 | 1.59522 | 67.7 |
| 24 | −14.750 | 0.60 | 2.00100 | 29.1 |
| 25 | −28.599 | (variable) | | |
| 26 | ∞ | 1.97 | 1.51633 | 64.1 |
| 27 | ∞ | | | |
| Image plane | ∞ | | | |

Aspherical surface data

17th surface

K = −3.95101e−001  A4 = −7.22781e−006  A6 = −1.67185e−007

21st surface

K = −1.49619e+000  A4 = −5.51867e−007  A6 = 7.68037e−007

Various data
Zoom ratio 19.34

| | Wide angle | Intermediate | Telephoto |
|---|---|---|---|
| Focal length | 4.33 | 37.32 | 83.84 |
| F-number | 1.85 | 2.68 | 2.88 |
| Half angle of view (degrees) | 32.43 | 4.22 | 1.88 |
| Image height | 2.75 | 2.75 | 2.75 |
| Total lens length | 94.99 | 94.99 | 94.99 |
| BF | 8.94 | 16.59 | 12.16 |
| d7 | 1.24 | 27.12 | 31.07 |
| d15 | 32.11 | 6.23 | 2.28 |
| d16 | 6.21 | 4.09 | 3.10 |
| d22 | 12.52 | 6.98 | 12.41 |
| d25 | 6.64 | 14.30 | 9.86 |

Zoom lens unit data

| Unit | Starting surface | Focal length |
|---|---|---|
| 1 | 1 | 44.92 |
| 2 | 8 | −6.94 |
| 3 | 16 | ∞ |
| 4 | 17 | 23.22 |
| 5 | 23 | 27.79 |
| 6 | 26 | ∞ |

TABLE 1

| Conditional expression | Numerical Example | | | |
|---|---|---|---|---|
| | 1 | 2 | 3 | 4 |
| (1) | −3.805 | −4.808 | −4.600 | −4.300 |
| (2) | −1.942 | −1.990 | −1.800 | −1.600 |
| (3) | −5.833 | −10.789 | −22.434 | −9.574 |
| (4) | 1.152 | 1.087 | 1.087 | 1.310 |
| (5) | 1.209 | 1.176 | 1.176 | 1.240 |

The following describes an example of an image pickup device (video camera) that uses the zoom lens according to the present invention as an imaging optical system, with reference ho FIG. 9.

In FIG. 9, a video camera main body 10 is a main body of the video camera. An imaging optical system 11 includes the zoom lens described in any of Embodiments 1 to 4. A solid-state image pickup element 12 such as a CCD sensor or a CMOS sensor is included in the camera main body, and receives a subject image ferried by the imaging optical system 11. A memory 13 records information corresponding to the subject image photoelectrically converted by the solid-state image pickup element 12. An electronic viewfinder 14 is used to observe the subject image photoelectrically converted by the solid-state image pickup element 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-066107, filed Mar. 27, 2013, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power; and
   a fourth lens unit having positive refractive power,
   wherein during zooming, the first lens unit is not moved, and the second lens unit, the third lens unit, and the fourth lens unit are moved to change an interval between adjacent lens units,
   wherein the following conditional expressions are satisfied:

$-4.9 < m2/f2 < -3.7,$ $-2.0 < f2/fw < -1.5,$ and $-25.0 < m2/m3 < -5.5,$ where m2 is a moving amount of the second lens unit during zooming, which is a difference of a position of the second lens unit on an optical axis of the zoom lens at a wide angle end and at a telephoto end, m3 is a moving amount of the third lens unit during zooming, which is a difference of a position of the third lens unit on the optical axis of the zoom lens at the wide angle end and at the telephoto end, f2 is a focal length of the second lens unit, and fw is a focal length of the zoom lens at the wide angle end.

2. The zoom lens according to claim 1, wherein the first lens unit includes one negative lens and at most three positive lenses.

3. The zoom lens according to claim 1, wherein the second lens unit includes a negative lens, a negative lens, a negative lens, and a positive lens, in order from the object side to the image side.

4. The zoom lens according to claim 1, further comprising an aperture stop between the second lens unit and the third lens unit,
   wherein the aperture stop is not moved during zooming.

5. The zoom lens according to claim 1, wherein the following conditional expression is satisfied $0.05 < N1pr/N1pf < 1.40,$ where the first lens unit includes, nearest the image side, a lens G1pr having positive refractive power, N1pr is a refractive index of a material of the lens G1pr, and N1pf is a mean value of refractive indices of materials of lenses having a positive refractive power in the first lens unit other than the lens G1pr.

6. The zoom lens according to claim 1, wherein the following conditional expression is satisfied $1.1 < N34n/N34p < 1.3,$ where N34n is a mean value of refractive indices of materials of negative lenses included in the third lens unit and the fourth lens unit, and N34p is a mean value of refractive indices of materials of positive lenses included in the third lens unit and the fourth lens unit.

7. An image pickup device comprising:
   a zoom lens; and
   an image pickup element for receiving an image formed by the zoom lens,
   wherein the zoom lens comprises, in an order from an object side to an image side:
   a first lens unit having positive refractive power;
   a second lens unit having negative refractive power;
   a third lens unit having positive refractive power; and
   a fourth lens unit having positive refractive power,
   wherein during zooming, the first lens unit is not moved, and the second lens unit, the third lens unit, and the fourth lens unit are moved to change an interval between adjacent lens units,
   wherein the following conditional expressions are satisfied:

$-4.9 < m2/f2 < -3.7,$ $-2.0 < f2/fw < -1.5,$ and $-25.0 < m2/m3 < -5.5,$ where m2 is a moving amount of the second lens unit during zooming, which is a difference of a position of the second lens unit on an optical axis of the zoom lens at a wide angle end and at a telephoto end, m3 is a moving amount of the third lens unit during zooming, which is a difference of a position of the third lens unit on the optical axis of the zoom lens at the wide angle end and at the telephoto end, f2 is a focal length of the second lens unit, and fw is a focal length of the zoom lens at the wide angle end.

* * * * *